US012716743B2

(12) United States Patent
Dong et al.

(10) Patent No.: US 12,716,743 B2
(45) Date of Patent: Aug. 25, 2026

(54) METHODS AND SYSTEMS FOR RELATIVE LOCALIZATION FOR OPERATING CONNECTED VEHICLES

(71) Applicant: Toyota Motor Engineering & Manufacturing North America, Inc., Plano, TX (US)

(72) Inventors: Jiqian Dong, Mountain View, CA (US); Hongsheng Lu, Mountain View, CA (US); Qi Chen, Mountain View, CA (US); Akila C. Ganlath, Mountain View, CA (US)

(73) Assignees: Toyota Motor Engineering & Manufacturing North America, Inc., Plano, TX (US); Toyota Jidosha. Kabushiki Kaisha, Toyota (JP)

( * ) Notice: Subject to any disclaimer, the term of this patent is extended or adjusted under 35 U.S.C. 154(b) by 472 days.

(21) Appl. No.: 18/104,944

(22) Filed: Feb. 2, 2023

(65) Prior Publication Data

US 2024/0230367 A1 Jul. 11, 2024

Related U.S. Application Data

(60) Provisional application No. 63/437,198, filed on Jan. 5, 2023.

(51) Int. Cl.
*G01C 21/00* (2006.01)
*B60W 60/00* (2020.01)
(Continued)

(52) U.S. Cl.
CPC ....... *G01C 21/3815* (2020.08); *B60W 60/001* (2020.02); *G01C 21/3837* (2020.08);
(Continued)

(58) Field of Classification Search
None
See application file for complete search history.

(56) References Cited

U.S. PATENT DOCUMENTS 10,928,207 B2 2/2021 Zhang et al.
11,363,754 B2 6/2022 Bertucci et al.
(Continued)

FOREIGN PATENT DOCUMENTS

JP 2018173749 A * 11/2018
WO 2016118672 A2 7/2016
WO 2021138616 A1 7/2021

OTHER PUBLICATIONS

Translation of JP2018173749A (Year: 2025).*
(Continued)

*Primary Examiner* — Adam D Tissot
*Assistant Examiner* — Charles Pall
(74) *Attorney, Agent, or Firm* — Dinsmore & Shohl LLP

(57) ABSTRACT

A method for relative localization is provided. The method includes obtaining key points from a point cloud obtained by a sender vehicle, obtaining road boundary coordinates from course map information, comparing the road boundary coordinates against the key points to generate matched road boundary points and to calibrate the key points, generating augmented key points by combining the matched road boundary points and calibrated key points of a receiver vehicle, registering the calibrated key points of the sender vehicle against the augmented key points to generate a transformation matrix, and transforming coordinates of the sender vehicle into a coordinate system of the receiver vehicle using the transformation matrix.

20 Claims, 7 Drawing Sheets

(51) Int. Cl.

| | |
|---|---|
| ***G06T 7/11*** | (2017.01) |
| ***G06T 7/33*** | (2017.01) |
| ***G06T 7/73*** | (2017.01) |
| ***G08G 1/0967*** | (2006.01) |

(52) U.S. Cl.

CPC ................ *G06T 7/11* (2017.01); *G06T 7/337* (2017.01); *G06T 7/74* (2017.01); *G08G 1/096725* (2013.01); *B60W 2556/45* (2020.02); *G06T 2207/10028* (2013.01); *G06T 2207/20021* (2013.01); *G06T 2207/30256* (2013.01)

(56) References Cited

U.S. PATENT DOCUMENTS

| | | | | |
|---|---|---|---|---|
| 2021/0141100 | A1* | 5/2021 | Castorena Martinez | G01S 5/0072 |
| 2021/0263135 | A1* | 8/2021 | Chen | G01S 17/89 |
| 2021/0370968 | A1* | 12/2021 | Xiao | G01C 21/3848 |
| 2022/0196849 | A1 | 6/2022 | Chen et al. | |
| 2022/0228882 | A1* | 7/2022 | Goldman | G01C 21/387 |
| 2023/0303113 | A1* | 9/2023 | Teo | G01S 7/417 |

OTHER PUBLICATIONS

Hongyu Li, et al., "Bridging the Gap Between Point Cloud Registration and Connected Vehicles," IEEE Open Journal of Vehicular Technology, Published Apr. 8, 2022, vol. 3, pp. 178-192.

Yunshuang Yuan, et al., "Keypoints-Based Deep Feature Fusion for Cooperative Vehicle Detection of Autonomous Driving," IEEE Robotics and Automation Letters, Feb. 15, 2022, vol. 7, No. 2, pp. 3054-3061.

Peng Gao, et al., "Correspondence Identification for Collaborative Multi-Robot Perception Under Uncertainty," SpringerLink Article of Autonomous Robots, Published Aug. 11, 2021, vol. 46, No. 1, pp. 5-20.

* cited by examiner

METHODS AND SYSTEMS FOR RELATIVE LOCALIZATION FOR OPERATING CONNECTED VEHICLES

CROSS-REFERENCE TO RELATED APPLICATION

This application claims the benefit of U.S. Provisional Application No. 63/437,198 filed on Jan. 5, 2023, the entire contents of which are herein incorporated by reference.

TECHNICAL FIELD

The present specification relates to systems and methods for relative localization for operating connected vehicles, and more particularly, relative localization for cooperative perception by comparing road boundary coordinates of map information, the point cloud of a sender vehicle, and the point cloud of a receiver vehicle.

BACKGROUND

Cooperative perception refers to an idea where a vehicle uses its local perceptual data and neighboring vehicles' sensing data (e.g., RGB data, Lidar data, radar data) to understand surrounding environment. Relative localization means accurate estimation of a sender vehicle's pose information in the coordinate frame of a receiver vehicle, or vice-visa. The pose information includes location and orientation of a vehicle.

Relative localization is a crucial step in enabling cooperative perception. Without relative localization, the sensing data received from neighboring vehicles have no accurate targeted place to be merged to in the local dynamic map of the receiver vehicle. Conventional relative localization technologies use an HD map, which is expensive and requires a lot of data processing. Other conventional relative localization technologies utilizes relative localization through commonly visible street objects. However, these technologies may not work well with large GPS errors.

Accordingly, a need exists for providing a method and system for accurately calculating relative localization using simple map data and GPS data, without requiring an HD map.

SUMMARY

The present disclosure provides systems and methods for relative localization for operating tasks of connected vehicles, e.g., cooperative perception, collision avoidance between connected vehicles, an advanced driver-assistance system, and the like.

In one embodiment, a method for relative localization is provided. The method includes obtaining key points from a point cloud obtained by a sender vehicle, obtaining road boundary coordinates from course map information, comparing the road boundary coordinates against the key points to generate matched road boundary points and to calibrate the key points, generating augmented key points by combining the matched road boundary points and calibrated key points of a receiver vehicle, registering the calibrated key points of the sender vehicle against the augmented key points to generate a transformation matrix, and transforming coordinates of the sender vehicle into a coordinate system of the receiver vehicle using the transformation matrix.

In another embodiment, a device includes a controller programmed to: obtain key points from a point cloud obtained by a sender vehicle, obtain road boundary coordinates from course map information, compare the road boundary coordinates against the key points to generate matched road boundary points and to calibrate the key points, generate augmented key points by combining the matched road boundary points and calibrated key points of a receiver vehicle, register the calibrated key points of the sender vehicle against the augmented key points to generate a transformation matrix, and transform coordinates of the sender vehicle into a coordinate system of the receiver vehicle using the transformation matrix.

In yet another embodiment, a system includes a sender vehicle and a receiver vehicle. The sender vehicle includes a controller programmed to: obtain key points from a point cloud obtained by the sender vehicle, obtain road boundary coordinates from course map information, and compare the road boundary coordinates against the key points to generate matched road boundary points and to calibrate the key points. The receiver vehicle includes a controller programmed to: generate augmented key points by combining the matched road boundary points and calibrated key points of the receiver vehicle, register the calibrated key points of the sender vehicle against the augmented key points to generate a transformation matrix, and transform coordinates of the sender vehicle into a coordinate system of the receiver vehicle using the transformation matrix.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Figure 4A:
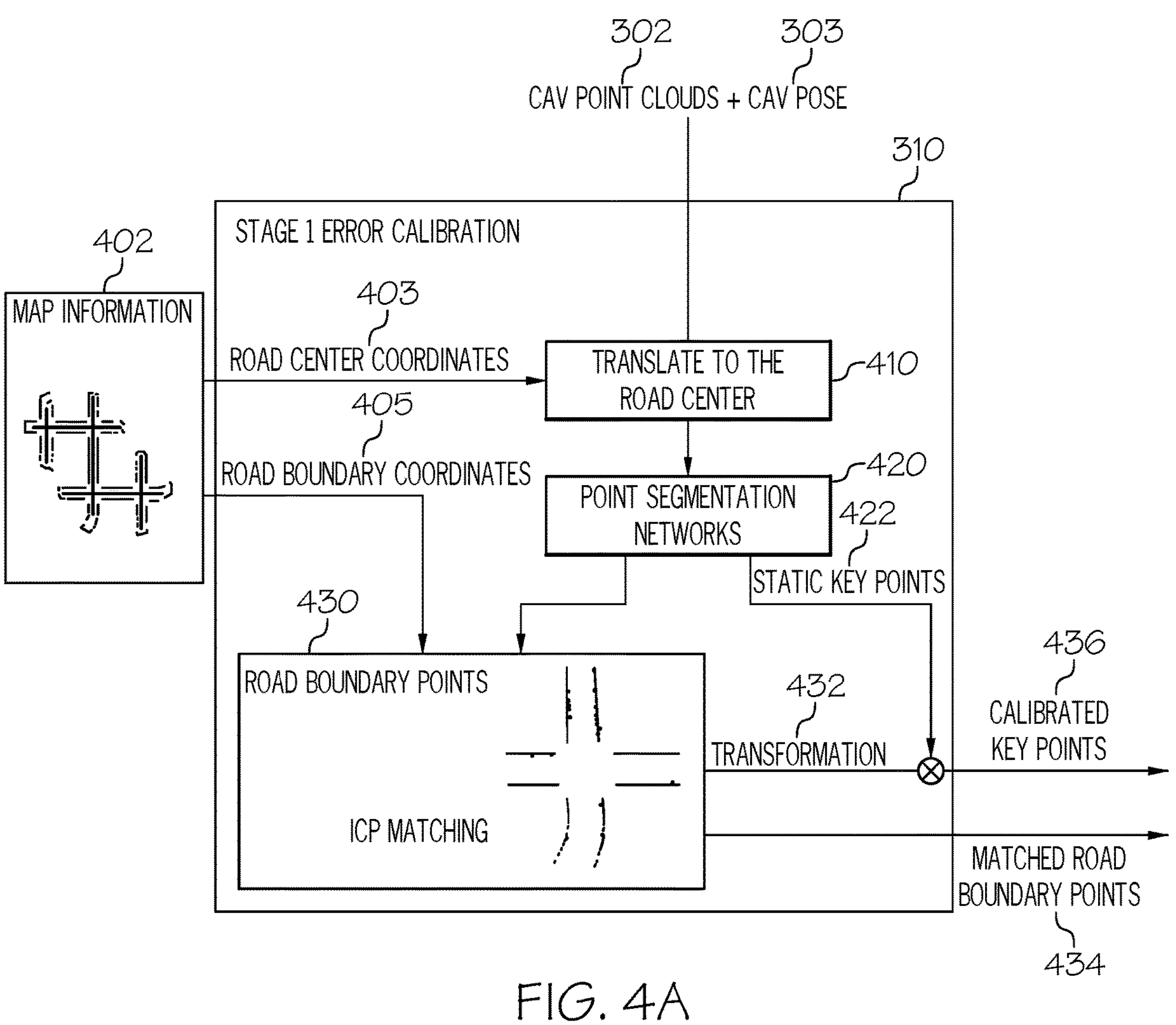
FIG. 4A depicts stage 1 intra vehicle error calibration for the point cloud of a sender vehicle, according to one or more embodiments shown and described herein.
Figure 4B:
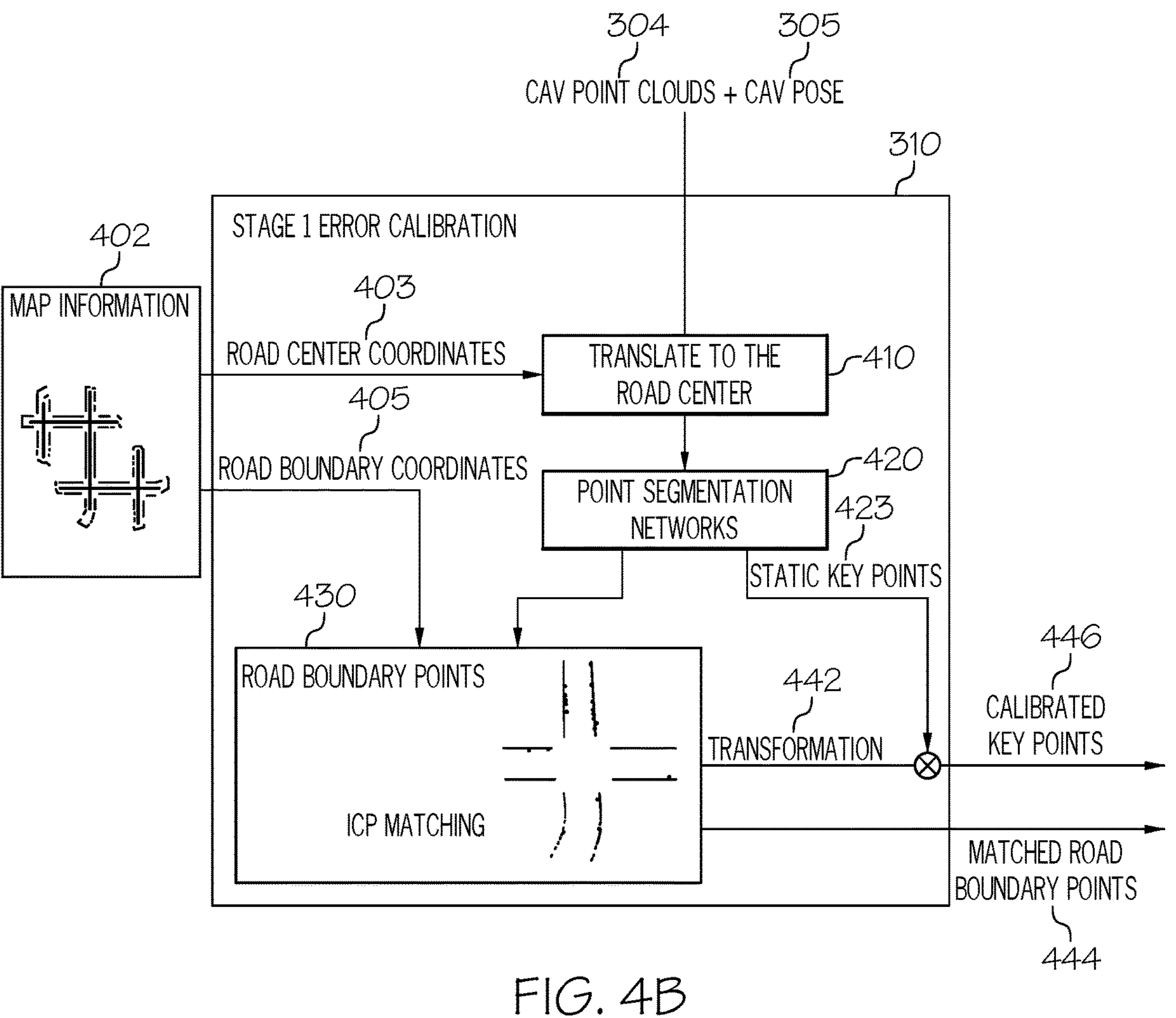
FIG. 4B depicts stage 1 intra vehicle error calibration for the point cloud of a receiver vehicle, according to one or more embodiments shown and described herein.

The embodiments disclosed herein include systems and methods for relative localization for cooperative perception. Referring to FIGS. 1, 4A, 4B, and 5, the present system includes a first connected vehicle 110 or a sender vehicle and a second connected vehicle 120 or a receiver vehicle. The first connected vehicle 110 obtains a point cloud 302 and its pose information 303 using one or more sensors of the first connected vehicle 110 as shown in FIG. 4A. The point cloud 302 and the pose information 303 are fed into a stage 1 intra connected autonomous vehicle (CAV) error calibration module 310 along with road center coordinates 403 and road boundary coordinates 405 obtained from map information 402. The stage 1 intra CAV error calibration module 310 processes the received inputs to output calibrated key points 436 of the first connected vehicle 110 and matched road boundary points 434 of the first connected vehicle 110. Similarly, the similar procedure is implemented for the second point cloud 304 and the pose information 305 of the second connected vehicle 120 as illustrated in FIG. 4B.

Then, a stage 2 inter CAV key points matching module 320 processes the matched road boundary points 434 of the first connected vehicle 110, the calibrated key points 436 of the first connected vehicle 110, and the calibrated key points 446 of the second connected vehicle 120 to obtain a vehicle-to-vehicle (V2V) transformation matrix 412. Then, the receiver vehicle may transform coordinates of the sender vehicle into a coordinate system of the receiver vehicle using the transformation matrix.

According to the present disclosure, the present system accurately calculates relative localization using simple map data and noisy GPS data without an HD map such that inaccuracy due to GPS errors and the cost of using HD map can be minimized.

Figure 1:
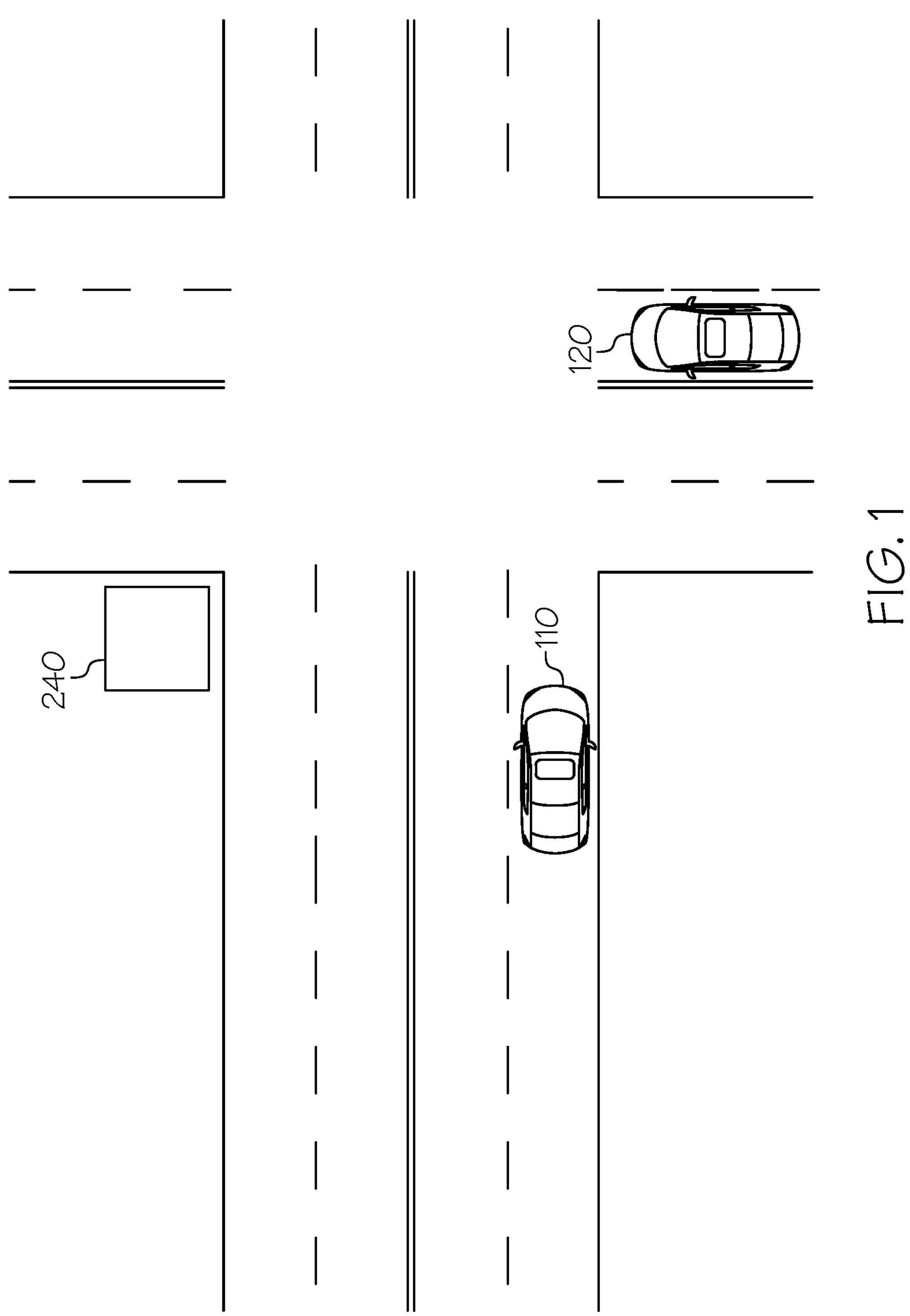
FIG. 1 schematically depicts a system for relative localization, according to one or more embodiments shown and described herein.

FIG. 1 schematically depicts a system for relative localization, according to one or more embodiments shown and described herein. In embodiments, a system includes first and second connected vehicles 110 and 120, and a server 240. The server 240 may be a local server including, but not limited to, roadside unit, an edge server, and the like. In some embodiments, the server 240 may be a remote server such as a cloud server.

Each of the first and second connected vehicles 110 and 120 may be a vehicle including an automobile or any other passenger or non-passenger vehicle such as, for example, a terrestrial, aquatic, and/or airborne vehicle. In some embodiment, one or more of the first and second connected vehicles 110 and 120 may be an unmanned aerial vehicle (UAV), commonly known as a drone.

The first and second connected vehicles 110 and 120 may be autonomous and connected vehicles, each of which navigates its environment with limited human input or without human input. The first and second connected vehicles 110 and 120 are equipped with internet access and share data with other devices both inside and outside the first and second connected vehicles 110 and 120. Each of the first and second connected vehicles 110 and 120 may include an actuator such as an engine, a motor, and the like to drive the vehicle. The first and second connected vehicles 110 and 120 may communicate with the server 240. The server 240 may communicated with vehicles in an area covered by the server 240. The server 240 may communicate with other servers that cover different areas. The server 240 may communicate with a remote server and transmit information collected by the server 240 to the remote server.

In FIG. 1, the first connected vehicle 110 and the second connected vehicle 120 are encountering the same scene with different perspectives. As illustrated in FIG. 1, the first connected vehicle 110 and the second connected vehicle 120 may approach an intersection from different directions. The first connected vehicle 110 may be a sender vehicle that views an intersection, road boundaries, static objects such as trees, building, traffic lights, and moving objects such as other vehicles. The second connected vehicle 120 may be a receiver vehicle that may also view an intersection, road boundaries, static objects such as trees, building, traffic lights, and moving objects such as other vehicles. However, the pose of the first connected vehicle 110, i.e., the location and orientation of the first connected vehicle 110 is different from the pose of the second connected vehicle 120. Thus, when the second connected vehicle 120 needs to utilize sensing data received from the first connected vehicle 110, the data received from the first connected vehicle 110 needs to be transformed into a coordinate system of the second connected vehicle 120.

In embodiments, the first connected vehicle 110 obtains a point cloud and its pose information using its sensors. The first connected vehicle 110 implements a stage 1 intra CAV error calibration on the point cloud and the pose information to obtain calibrated key points and matched road boundary points, and transmits the calibrated key points and matched road boundary points to the second connected vehicle 120. The details of the stage 1 intra CAV error calibration will be described in detail with reference to FIG. 4A below. Similarly, the second connected vehicle 120 implements a stage 1 intra CAV error calibration on the point cloud and the pose information to obtain calibrated key points and matched road boundary points. The second connected vehicle 120 implements a stage 2 inter CAV key point matching on the matched road boundary points and calibrated key points received from the first connected vehicle 110 and the calibrated key points generated by the second connected vehicle 120 to obtain a V2V transformation matrix. The details of the stage 2 inter CAV key point matching will be described in detail with reference to FIG. 4B below. Then, the second connected vehicle 120 transforms sensing data received from the first connected vehicle 110 into a coordinate system of the second connected vehicle 120 using the V2V transformation matrix.

In some embodiments, the stage 1 intra CAV error calibration and the stage 2 inter CAV key point matching may be implemented in the server 240. For example, the first connected vehicle 110 may send its obtained point cloud and pose information to the server 240. Similarly, the second connected vehicle 120 may send its obtained point cloud and pose information to the server 240. The server 240 may apply the stage 1 intra CAV error calibration to the point cloud and pose information received from the first connected vehicle 110 to obtain matched road boundary points and calibrated key points. In addition, the server 240 may apply the stage 1 intra CAV error calibration to the point cloud and pose information received from the second connected vehicle 120 to obtain matched road boundary points and calibrated key points. Then, the server 240 implements a stage 2 inter CAV key point matching on the matched road boundary points and calibrated key points obtained from data of the first connected vehicle 110 and the calibrated key points obtained from data of the second connected vehicle 120 to obtain a V2V transformation matrix, i.e., a first-to-second connected vehicle transformation matrix. Then, the server 240 may transmit the V2V transformation matrix to the second connected vehicle 120 such that the second connected vehicle 120 transforms sensing data received from the first connected vehicle 110 into a coordinate system of the second connected vehicle 120 using the V2V transformation matrix. In other example, the server 240 implements a stage 2 inter CAV key point matching on the matched road boundary points and calibrated key points obtained from data of the second connected vehicle 120 and the calibrated key points obtained from data of the first connected vehicle 110 to obtain a V2V transformation matrix, i.e., a second-to-first connected vehicle transformation matrix. Then, the server 240 may transmit the V2V transformation matrix to the first connected vehicle 110 such that the first connected vehicle 110 transforms sensing data received from the second connected vehicle 120 into a coordinate system of the first connected vehicle 110 using the V2V transformation matrix.

In some embodiments, the stage 1 intra CAV error calibration may be implemented in the server 240 and the stage 2 inter CAV key point matching may be implemented in the second connected vehicle 120 or in the first connected vehicle 110. Specifically, the first connected vehicle 110 may send its obtained point cloud and pose information to the server 240. Similarly, the second connected vehicle 120 may send its obtained point cloud and pose information to the server 240. The server 240 may apply the stage 1 intra CAV error calibration to the point cloud and pose information received from the first connected vehicle 110 to obtain matched road boundary points and calibrated key points. In addition, the server 240 may apply the stage 1 intra CAV error calibration to the point cloud and pose information received from the second connected vehicle 120 to obtain matched road boundary points and calibrated key points. The server 240 transmits the matched road boundary points and calibrated key points obtained from data of the first connected vehicle 110 and the matched road boundary points and calibrated key points obtained from the data of the second connected vehicle 120 to the second connected vehicle 120. Then, the second connected vehicle 120 implements the stage 2 inter CAV key point matching on the received data.

While FIG. 1 illustrates two connected vehicles cooperatively capturing views, more connected vehicles may be involved as to cooperative perceptions. In addition, while FIG. 1 illustrates one server, more than one server may be involved as to cooperative perceptions.

Figure 2:
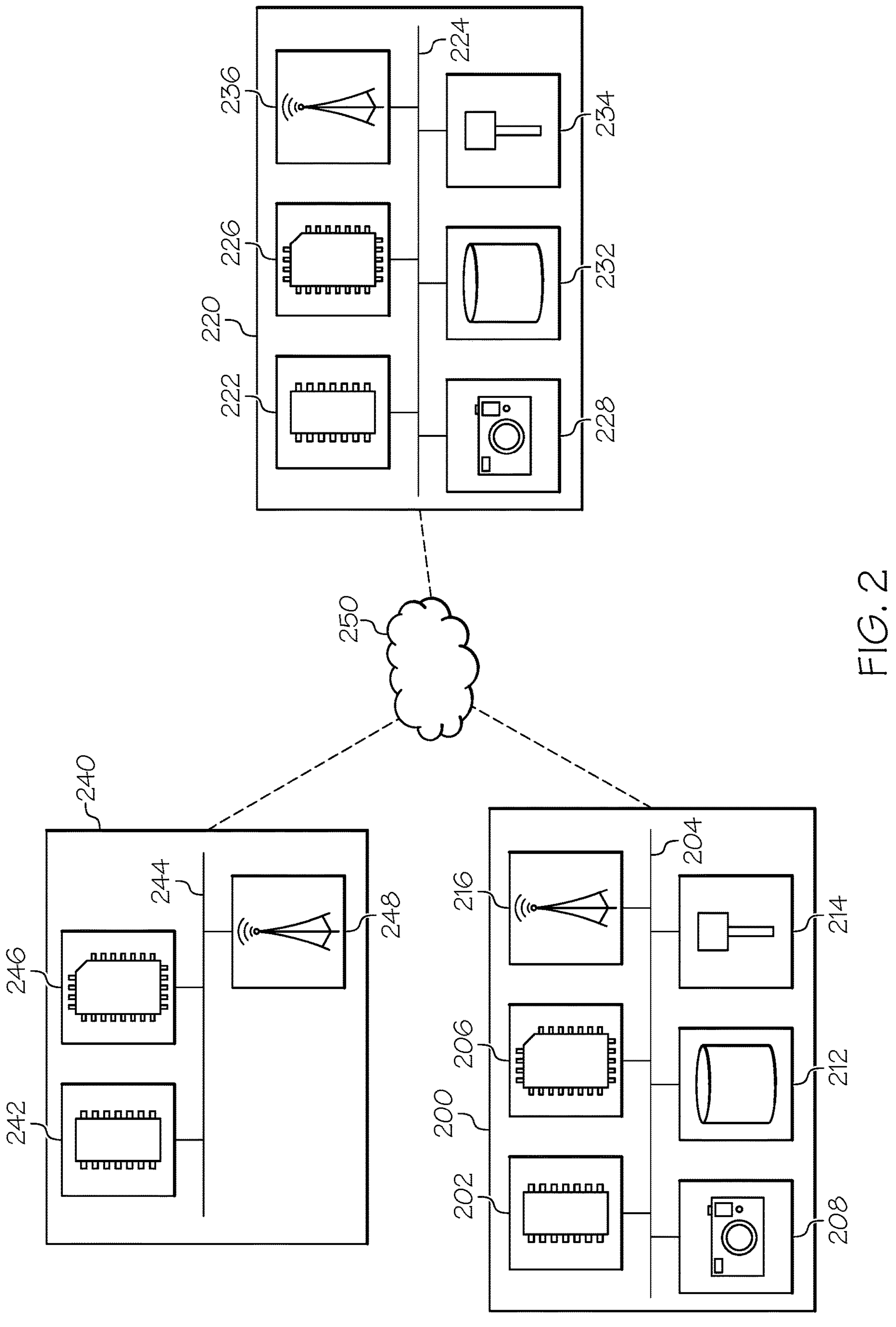
FIG. 2 schematically depicts a system for relative localization, according to one or more embodiments shown and described herein.

FIG. 2 schematically depicts a system for relative localization, according to one or more embodiments shown and described herein. The system for interpreting a traffic scene includes a first connected vehicle system 200, a second connected vehicle system 220, and a server 240.

It is noted that, while the first connected vehicle system 200 and the second connected vehicle system 220 are depicted in isolation, each of the first connected vehicle system 200 and the second connected vehicle system 220 may be included within a vehicle in some embodiments, for example, respectively within each of the connected vehicles 110 and 120 of FIG. 1A. In embodiments in which each of the first connected vehicle system 200 and the second connected vehicle system 220 is included within a vehicle, the vehicle may be an automobile or any other passenger or non-passenger vehicle such as, for example, a terrestrial, aquatic, and/or airborne vehicle. In some embodiments, the vehicle is an autonomous vehicle that navigates its environment with limited human input or without human input.

The first connected vehicle system 200 includes one or more processors 202. Each of the one or more processors 202 may be any device capable of executing machine readable and executable instructions. Accordingly, each of the one or more processors 202 may be a controller, an integrated circuit, a microchip, a computer, or any other computing device. The one or more processors 202 are coupled to a communication path 204 that provides signal interconnectivity between various modules of the system. Accordingly, the communication path 204 may communicatively couple any number of processors 202 with one another, and allow the modules coupled to the communication path 204 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 204 may be formed from any medium that is capable of transmitting a signal such as, for example, conductive wires, conductive traces, optical waveguides, or the like. In some embodiments, the communication path 204 may facilitate the transmission of wireless signals, such as WiFi, Bluetooth®, Near Field Communication (NFC) and the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The first connected vehicle system 200 includes one or more memory modules 206 coupled to the communication path 204. The one or more memory modules 206 may comprise RAM, ROM, flash memories, hard drives, or any device capable of storing machine readable and executable instructions such that the machine readable and executable instructions can be accessed by the one or more processors 202. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 206. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

The one or more memory modules 206 may include machine readable instructions that, when executed by the one or more processors 202, obtain key points from a point cloud obtained by one or more sensors 208, obtain road local boundary coordinates from local course map information, compare the road local boundary coordinates against the key points to generate matched road boundary points and to calibrate the key points, and transmit the matched road boundary points and the calibrated key points to the second connected vehicle system 220 or the server 240.

Referring still to FIG. 2, the first connected vehicle system 200 comprises one or more sensors 208. The one or more sensors 208 may be any device having an array of sensing devices capable of detecting radiation in an ultraviolet wavelength band, a visible light wavelength band, or an infrared wavelength band. The one or more sensors 208 may have any resolution. In some embodiments, one or more optical components, such as a mirror, fish-eye lens, or any other type of lens may be optically coupled to the one or more sensors 208. In embodiments described herein, the one or more sensors 208 may provide image data such as point clouds to the one or more processors 202 or another component communicatively coupled to the communication path 204. The image data may include image data of the traffic incident 130 in FIG. 1. In some embodiments, the one or more sensors 208 may also provide navigation support. That is, data captured by the one or more sensors 208 may be used to autonomously or semi-autonomously navigate the connected vehicle 110.

In some embodiments, the one or more sensors 208 include one or more imaging sensors configured to operate in the visual and/or infrared spectrum to sense visual and/or infrared light. Additionally, while the particular embodiments described herein are described with respect to hardware for sensing light in the visual and/or infrared spectrum, it is to be understood that other types of sensors are contemplated. For example, the systems described herein could include one or more LIDAR sensors, radar sensors, sonar sensors, or other types of sensors and that such data could be integrated into or supplement the data collection described herein to develop a fuller real-time traffic image. Ranging sensors like radar may be used to obtain a rough depth and speed information for the view of the first connected vehicle system 200. The first connected vehicle system 200 may capture road boundaries, static objects, moving objects, and the like using one or more imaging sensors.

In operation, the one or more sensors 208 capture image data and communicate the image data to the one or more processors 202 and/or to other systems communicatively coupled to the communication path 204. The image data may be received by the one or more processors 202, which may process the image data using one or more image processing algorithms. Any known or yet-to-be developed video and image processing algorithms may be applied to the image data in order to identify an item or situation. Example video and image processing algorithms include, but are not limited to, kernel-based tracking (such as, for example, mean-shift tracking) and contour processing algorithms. In general, video and image processing algorithms may detect objects and movement from sequential or individual frames of image data. One or more object recognition algorithms may be applied to the image data to extract objects and determine their relative locations to each other. Any known or yet-to-be-developed object recognition algorithms may be used to extract the objects or even optical characters and images from the image data. Example object recognition algorithms include, but are not limited to, scale-invariant feature transform ("SIFT"), speeded up robust features ("SURF"), and edge-detection algorithms.

The first connected vehicle system 200 comprises a satellite antenna 214 coupled to the communication path 204 such that the communication path 204 communicatively couples the satellite antenna 214 to other modules of the first connected vehicle system 200. The satellite antenna 214 is configured to receive signals from global positioning system satellites. Specifically, in one embodiment, the satellite antenna 214 includes one or more conductive elements that interact with electromagnetic signals transmitted by global positioning system satellites. The received signal is transformed into a data signal indicative of the location (e.g., latitude and longitude) of the satellite antenna 214 or an object positioned near the satellite antenna 214, by the one or more processors 202.

The first connected vehicle system 200 comprises one or more vehicle sensors 212. Each of the one or more vehicle sensors 212 is coupled to the communication path 204 and communicatively coupled to the one or more processors 202. The one or more vehicle sensors 212 may include one or more motion sensors for detecting and measuring the orientation, motion and changes in motion of the vehicle. The motion sensors may include inertial measurement units. Each of the one or more motion sensors may include one or more accelerometers and one or more gyroscopes. Each of the one or more motion sensors transforms sensed physical movement of the vehicle into a signal indicative of an orientation, a rotation, a velocity, or an acceleration of the vehicle.

Still referring to FIG. 2, the first connected vehicle system 200 comprises network interface hardware 216 for communicatively coupling the first connected vehicle system 200 to the second connected vehicle system 220 and/or the server 240. The network interface hardware 216 can be communicatively coupled to the communication path 204 and can be any device capable of transmitting and/or receiving data via a network. Accordingly, the network interface hardware 216 can include a communication transceiver for sending and/or receiving any wired or wireless communication. For example, the network interface hardware 216 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 216 includes hardware configured to operate in accordance with the Bluetooth® wireless communication protocol. The network interface hardware 216 of the first connected vehicle system 200 may transmit its data to the server 240. For example, the network interface hardware 216 of the first connected vehicle system 200 may transmit captured point cloud generated by the first connected vehicle system 200, vehicle data, location data, and the like to other connected vehicles or the server 240.

The first connected vehicle system 200 may connect with one or more external vehicles and/or external processing devices (e.g., the server 240) via a direct connection. The direct connection may be a vehicle-to-vehicle connection ("V2V connection") or a vehicle-to-everything connection ("V2X connection"). The V2V or V2X connection may be established using any suitable wireless communication protocols discussed above. A connection between vehicles may utilize sessions that are time-based and/or location-based. In embodiments, a connection between vehicles or between a vehicle and an infrastructure element may utilize one or more networks to connect (e.g., the network 250), which may be in lieu of, or in addition to, a direct connection (such as V2V or V2X) between the vehicles or between a vehicle and an infrastructure. By way of non-limiting example, vehicles may function as infrastructure nodes to form a mesh network and connect dynamically on an ad-hoc basis. In this way, vehicles may enter and/or leave the network at will, such that the mesh network may self-organize and self-modify over time. Other non-limiting network examples include vehicles forming peer-to-peer networks with other vehicles or utilizing centralized networks that rely upon certain vehicles and/or infrastructure elements. Still other examples include networks using centralized servers and other central computing devices to store and/or relay information between vehicles.

Still referring to FIG. 2, the first connected vehicle system 200 may be communicatively coupled to the server 240 by the network 250. In one embodiment, the network 250 may include one or more computer networks (e.g., a personal area network, a local area network, or a wide area network), cellular networks, satellite networks and/or a global positioning system and combinations thereof. Accordingly, the first connected vehicle system 200 can be communicatively coupled to the network 250 via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth®, Wireless USB, Z-Wave, ZigBee, and/or other near field communication protocols. Suitable cellular networks include, but are not limited to, technologies such as LTE, WiMAX, UMTS, CDMA, and GSM.

Still referring to FIG. 2, the server 240 includes one or more processors 242, one or more memory modules 246, network interface hardware 248, and a communication path 244. The one or more processors 242 may be a controller, an integrated circuit, a microchip, a computer, or any other computing device. The one or more memory modules 246 may comprise RAM, ROM, flash memories, hard drives, or any device capable of storing machine readable and executable instructions such that the machine readable and executable instructions can be accessed by the one or more processors 242. The communication path 244 may be similar to the communication path 204 in some embodiments.

The one or more memory modules 246 may include machine readable instructions that, when executed by the one or more processors 242, obtain key points from a point cloud obtained by the first connected vehicle system 200, obtain road boundary coordinates from course map information, compare the road boundary coordinates against the key points to generate matched road boundary points and to calibrate the key points, generate augmented key points by combining the matched road boundary points and calibrated key points of the second connected vehicle system 220, register the calibrated key points of the first connected vehicle system 200 against the augmented key points to generate a transformation matrix, and transmit the transformation matrix to the second connected vehicle system 220.

Still referring to FIG. 2, the second connected vehicle system 220 includes one or more processors 222, one or more memory modules 226, one or more sensors 228, one or more vehicle sensors 232, a satellite antenna 234, network interface hardware 236, and a communication path 224 communicatively connected to the other components of the second connected vehicle system 220. The components of the second connected vehicle system 220 may be structurally similar to and have similar functions as the corresponding components of the first connected vehicle system 200 (e.g., the one or more processors 222 corresponds to the one or more processors 202, the one or more memory modules 226 corresponds to the one or more memory modules 206, the one or more sensors 228 corresponds to the one or more sensors 208, the one or more vehicle sensors 232 corresponds to the one or more vehicle sensors 212, the satellite antenna 234 corresponds to the satellite antenna 214, the network interface hardware 236 corresponds to the network interface hardware 216, and the communication path 224 corresponds to the communication path 204).

The one or more memory modules 226 may include machine readable instructions that, when executed by the one or more processors 222, obtain key points from a point cloud obtained by one or more sensors 228, obtain road boundary coordinates from course map information, compare the road boundary coordinates against the key points to generate matched road boundary points and to calibrate the key points. In addition, the machine readable instructions, when executed by the one or more processors 222, generate augmented key points by combining the matched road boundary points of the first connected vehicle system 210 and the calibrated key points of the second connected vehicle system 220, register the calibrated key points of the first connected vehicle system 200 against the augmented key points to generate a transformation matrix, and transform coordinates of the first connected vehicle system 200 into a coordinate system of the second connected vehicle system 220 using the transformation matrix.

Figure 3:
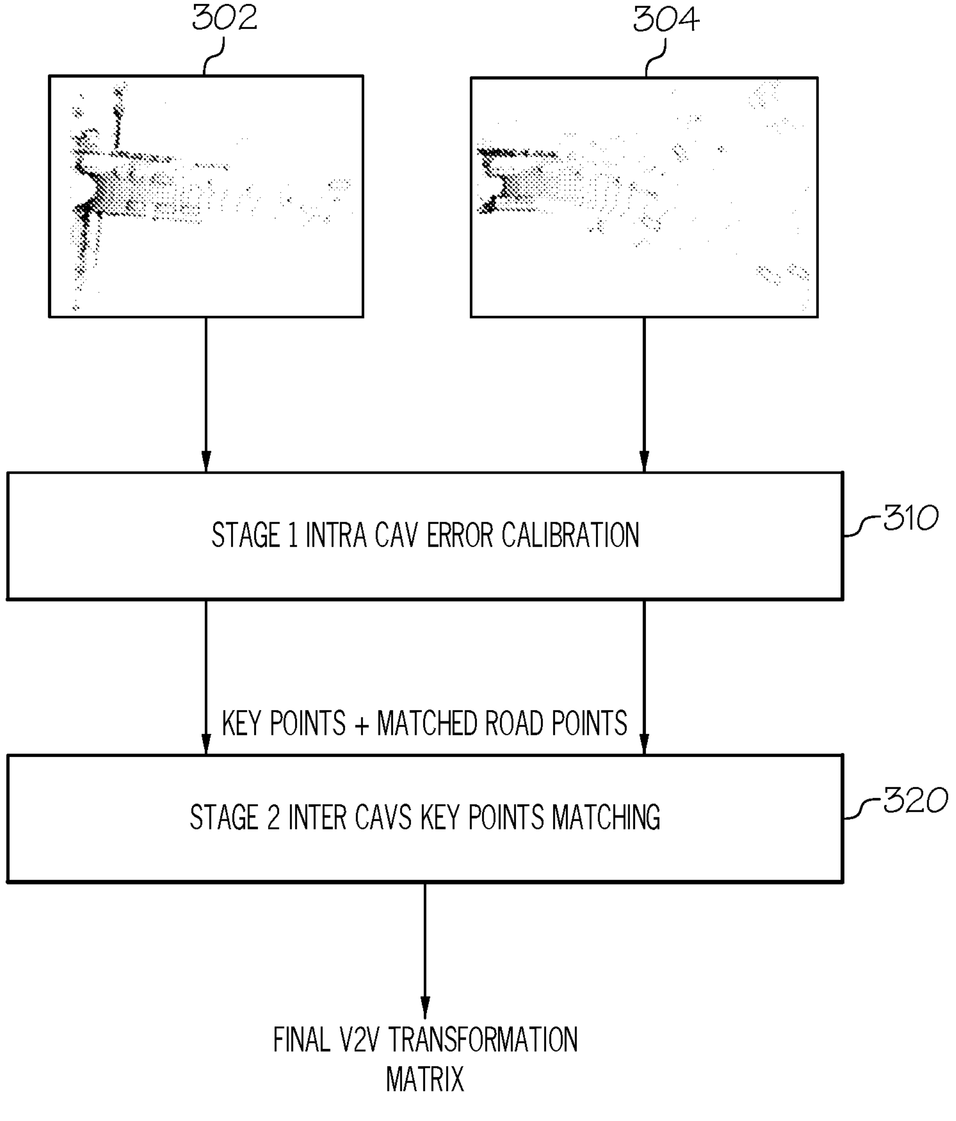
FIG. 3 depicts an overall process for determining a V2V transformation matrix used for relative location, according to one or more embodiments shown and described herein.

FIG. 3 depicts an overall process for determining a V2V transformation matrix used for relative location, according to one or more embodiments shown and described herein.

A first point cloud 302 obtained by a sender vehicle or a first connected vehicle and a second point cloud 304 obtained by a receiver vehicle or a second connected vehicle are input to a stage 1 intra connected autonomous vehicle (CAV) error calibration module 310. The stage 1 intra CAV error calibration module 310 may be included in each of a sender vehicle and a receiver vehicle. In another example, the stage 1 intra CAV error calibration module 310 may be included in the server 240. The stage 1 intra CAV error calibration module 310 processes the first point cloud 302 and the second point cloud 304 and outputs calibrated key points and matched road points for each of the first point cloud and the second point cloud to a stage 2 inter CAV key points matching module 320. The stage 2 inter CAV key points matching module 320 may be included in each of the sender vehicle and the receiver vehicle. In another example, the stage 2 inter CAV key points matching module 320 may be included in the server 240. FIGS. 4A and 4B depicts the stage 1 intra CAV error calibrations for the first point cloud 302 and the second point cloud 304, respectively.

By referring to FIG. 4A, the stage 1 intra CAV error calibration module 310 receives the first point cloud 302, the pose information 303 of the sender vehicle, and map information 402 as inputs. The pose information 303 of the sender vehicle includes the location and the orientation of the sender vehicle. The map information may be an image of a map for an area covering the location of the sender vehicle. The image of the map may be an image taken by a satellite, or any other map image. Road center coordinates 403 are extracted from the map information 402 and input to a block 410. In the block 410, the first point cloud 302 is translated to road center lines based on the road center coordinates 403. The translated first point cloud is input to a block 420 where the translated first point cloud is segmented and static key points 422 are extracted. The static key points 422 may be points for road boundary, points for buildings, or points for any other static objects. Road boundary coordinates 405 are extracted from the map information 402 and input to a block 430 along with the static key points 422. In the block 430, iterative closest point (ICP) is implemented on the road boundary coordinates 405 and the static key points 422. The ICP is an algorithm employed to minimize the difference between two clouds of points. For example, the road boundary coordinates 405 are registered against the static key points 422 using the ICP to obtain transformation information 432 and to generate matched road boundary points 434. The transformation information 432 may be a transformation matrix that is obtained based on the difference between the road boundary coordinates 405 and the static key points 422. The matched road boundary points 434 consist of points that are included both in the road boundary coordinates 405 and the static key points 422. The static key points 422 are calibrated using the transformation information 432 to obtain calibrated key points 436.

By referring to FIG. 4B, the stage 1 intra CAV error calibration module 310 processes the second point cloud in a similar manner as the first point cloud. The stage 1 intra CAV error calibration module 310 receives the second point cloud 304, the pose 305 of the receiver vehicle, and the map information 402 as inputs. The pose 305 of the receiver vehicle includes the location and the orientation of the receiver vehicle. Road center coordinates 403 are extracted from the map information 402 and input to a block 410. In the block 410, the second point cloud 304 is translated to road center lines based on the road center coordinates 403. The translated second point cloud is input to a block 420 where the translated second point cloud is segmented and static key points 423 are extracted. The static key points 423 may be points for road boundary, points for buildings, or points for any other static objects. Road boundary coordinates 405 are extracted from the map information 402 and input to a block 430 along with the static key points 423. In the block 430, ICP is implemented on the road boundary coordinates 405 and the static key points 423. For example, the road boundary coordinates 405 are registered against the static key points 423 using the ICP to obtain transformation information 442 and to generate matched road boundary points 444. The transformation information 442 may be a transformation matrix that is obtained based on the difference between the road boundary coordinates 405 and the static key points 423. The matched road boundary points 444 consist of points that are included both in the road boundary coordinates 405 and the static key points 423. The static key points 423 are calibrated using the transformation information 442 to obtain calibrated key points 446.

Referring back to FIG. 3, the stage 2 inter CAV key points matching module 320 receives calibrated key points and matched road boundary points from the stage 1 intra CAV error calibration module and outputs a final V2V transformation matrix, which may be used by the receiver vehicle to transform coordinates of the sender vehicle into a coordinate system of the receiver vehicle. The stage 2 inter CAV key points matching module 320 may be included in each of a sender vehicle and a receiver vehicle. In another example, the stage 2 inter CAV key points matching module 320 may be included in the server 240.

Figure 5:
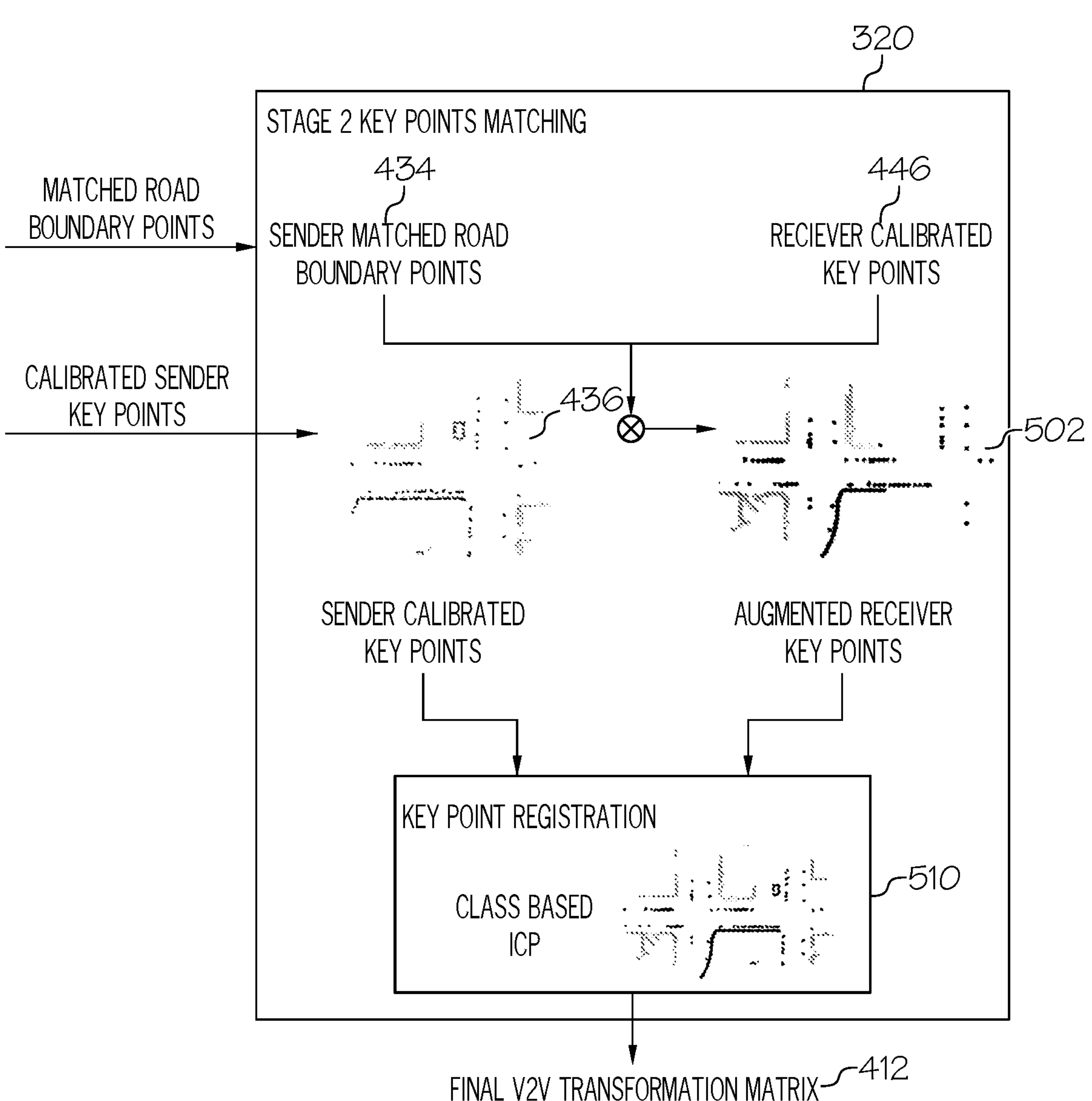
FIG. 5 depicts stage 2 inter vehicle key points matching, according to one or more embodiments shown and described herein.

By referring to FIG. 5, the stage 2 inter CAV key points matching module 320 receives the matched road boundary points 434 and the calibrated key points 436 of the sender vehicle and the calibrated key points 446 of the receiver vehicle as inputs. The matched road boundary points 434 of the sender vehicle and the calibrated key points 446 of the receiver vehicle are combined to generate augmented receiver key points 502. Then, the augmented receiver key points 502 and the calibrated key points 436 of the sender vehicle are input to a block 510. In the block 510, iterative closest point (ICP) is implemented on the augmented receiver key points 502 and the calibrated key points 436 of the sender vehicle. For example, the calibrated key points 436 of the sender vehicle are registered against the augmented receiver key points 502 using the ICP to obtain a final V2V transformation matrix 412. The final V2V transformation matrix 412 may be used by the receiver vehicle to transform coordinates of the sender vehicle into a coordinate system of the receiver vehicle.

Figure 6:
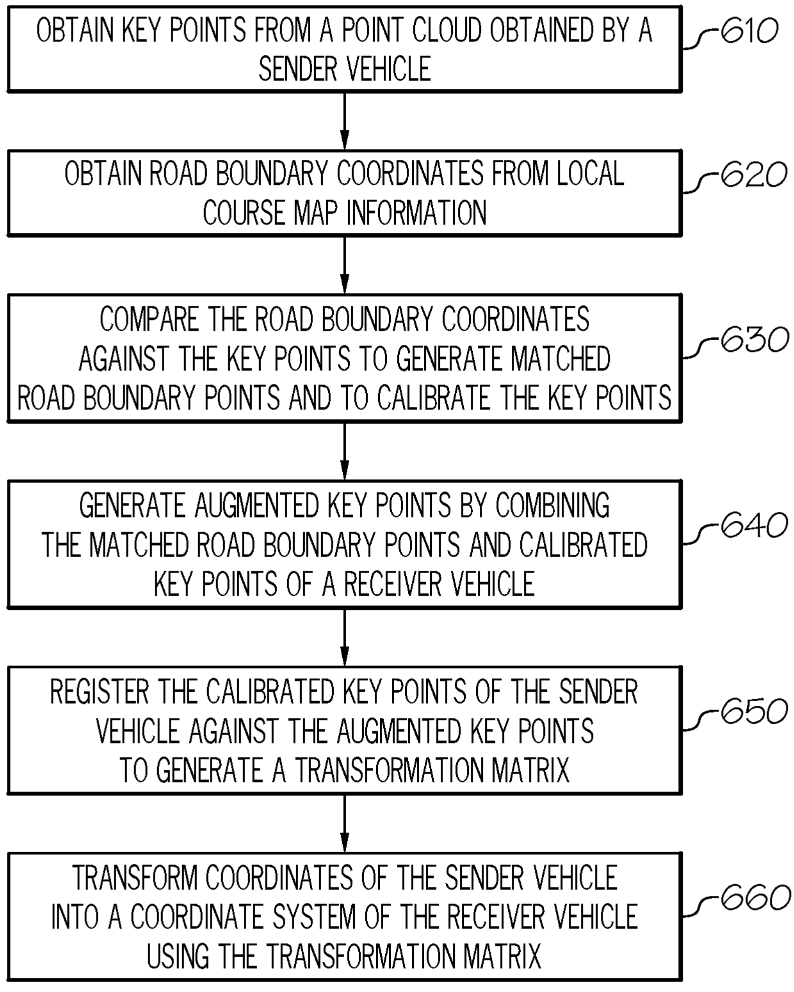
FIG. 6 depicts a flowchart for relative localization between two connected vehicles, according to one or more embodiments shown and described herein.

FIG. 6 depicts a flowchart for relative localization between two connected vehicles, according to one or more embodiments shown and described herein.

In step 610, the present system obtains key points from a point cloud obtained by a sender vehicle. In embodiments, a sender vehicle such as the first connected vehicle 110 in FIG. 1 obtains a point cloud using one or more sensors, e.g., Lidar sensors. The controller of the sender vehicle extracts key points from the point cloud. The extracted key points may be static key points such as points for road boundaries, buildings, or any static objects. In some embodiments, the sender vehicle transmits the point cloud to a server such as the server 240 in FIG. 1, and the server may extract key points from the point cloud.

In step 620, the present system obtains road boundary coordinates from map information. The map information may be retrieved based on the location of the sender vehicle. The road boundary coordinates are coordinates for road boundaries in the map information.

In step 630, the present system compares the road boundary coordinates against the key points to generate matched road boundary points and to calibrate the key points. In embodiments, the controller of the sender vehicle or the server registers the road boundary coordinates against the key points using an iterative closest point algorithm to obtain transformation information. The key points are calibrated using the transformation information. The matched road boundary points consist of points that are included both in the road boundary coordinates and the key points.

In step 640, the present system generates augmented key points by combining the matched road boundary points and calibrated key points of a receiver vehicle. In embodiments, the controller of the server or the receiver vehicle combines the matched road boundary points of the sender vehicle and the calibrated key points of the receiver vehicle to generate the augmented key points such as augmented receiver key points 502 in FIG. 5.

In step 650, the present system registers the calibrated key points of the sender vehicle against the augmented key points to generate a transformation matrix. In embodiments, the controller of the server or the receiver vehicle registers the calibrated key points of the sender vehicle against the augmented key points to generate a transformation matrix.

In step 660, the present system transforms coordinates of the sender vehicle into a coordinate system of the receiver vehicle using the transformation matrix. In embodiments, the controller of the receiver vehicle transforms coordinates of the sender vehicle into a coordinate system of the receiver vehicle using the transformation matrix. The controller of the receiver vehicle transforms data from the sender vehicle according to the transformed coordinates of the sender vehicle, and controls the receiver vehicle to drive autonomously based on data obtained by the receiver vehicle and the transformed data from the sender vehicle.

It should be understood that embodiments described herein are directed to methods and systems for relative localization between two connected autonomous vehicles. The present system obtains key points from a point cloud obtained by a sender vehicle, obtains road boundary coordinates from local course map information, compares the road boundary coordinates against the key points to generate matched road boundary points and to calibrate the key points, generates augmented key points by combining the matched road boundary points and calibrated key points of a receiver vehicle, registers the calibrated key points of the sender vehicle against the augmented key points to generate a transformation matrix, and transforms coordinates of the sender vehicle into a coordinate system of the receiver vehicle using the transformation matrix.

According to the present disclosure, the present system accurately calculates relative localization using simple map data and noisy GPS data without an HD map such that inaccuracy due to GPS errors and the cost of using HD map can be minimized.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for relative localization, the method comprising:

obtaining key points from a point cloud obtained by a sender vehicle;

obtaining road boundary coordinates from course map information;

comparing the road boundary coordinates against the key points;

obtaining transformation information based on the comparing, wherein the transformation information comprises a difference between the road boundary coordinates and the key points;

generating matched road boundary points based on the transformation information;

calibrating the key points to generate calibrated key points of the sender vehicle based on the comparing of the road boundary coordinates against the key points using the transformation information;

generating augmented key points by combining the matched road boundary points and calibrated key points of a receiver vehicle, wherein the calibrated key points of the receiver vehicle are based on a second point cloud and second pose information associated with the receiver vehicle;

registering the calibrated key points of the sender vehicle against the augmented key points to generate a vehicle-to-vehicle transformation matrix; and transforming coordinates of the sender vehicle into a coordinate system of the receiver vehicle using the vehicle-to-vehicle transformation matrix.

2. The method according to claim 1, wherein comparing the road boundary coordinates against the key points comprises registering the road boundary coordinates against the key points using an iterative closest point algorithm.

3. The method according to claim 1, further comprising:

translating the point cloud to a road center based on road center coordinates from the course map information; and segmenting the translated point cloud to obtain the key points.

4. The method according to claim 3, further comprising:

registering the road boundary coordinates against the key points using an iterative closest point algorithm to obtain transformation information; and calibrating the key points using the transformation information.

5. The method according to claim 1, wherein the matched road boundary points consist of points that are included both in the road boundary coordinates and the key points.

6. The method according to claim 1, further comprising:

comparing the road boundary coordinates against key points of the receiver vehicle to obtain another transformation information; and calibrating the key points of the receiver vehicle using the another transformation information to obtain the calibrated key points of the receiver vehicle.

7. The method according to claim 1, wherein the point cloud is obtained by one or more Lidar sensors of the sender vehicle.

8. The method according to claim 1, wherein the sender vehicle and receiver vehicle are connected autonomous vehicles.

9. The method according to claim 1, further comprising:

transforming data from the sender vehicle according to the transformed coordinates of the sender vehicle; and controlling the receiver vehicle to drive autonomously based on data obtained by the receiver vehicle and the transformed data from the sender vehicle.

10. A device comprising:

a controller programmed to:

obtain key points from a point cloud obtained by a sender vehicle;

obtain road boundary coordinates from course map information;

compare the road boundary coordinates against the key points;

obtain transformation information based on the comparing, wherein the transformation information comprises a difference between the road boundary coordinates and the key points;

generate matched road boundary points based on the transformation information;

calibrate the key points, based on transformation information to generate calibrated key points of the sender vehicle based on the comparing of the road boundary coordinates against the key points using transformation information;

generate augmented key points by combining the matched road boundary points and calibrated key points of a receiver vehicle, wherein the calibrated key points of the receiver vehicle are based on a second point cloud and second pose information associated with the receiver vehicle;

register the calibrated key points of the sender vehicle against the augmented key points to generate a vehicle-to vehicle transformation matrix; and transform coordinates of the sender vehicle into a coordinate system of the receiver vehicle using the vehicle-to vehicle transformation matrix.

11. The device according to claim 10, wherein the controller is further programmed to register the road boundary coordinates against the key points using an iterative closest point algorithm.

12. The device according to claim 10, wherein the controller is further programmed to:

translate the point cloud to a road center based on road center coordinates from the course map information; and segment the translated point cloud to obtain the key points.

13. The device according to claim 12, wherein the controller is further programmed to:

register the road boundary coordinates against the key points using an iterative closest point algorithm to obtain transformation information; and calibrate the key points using the transformation information.

14. The device according to claim 10, wherein the matched road boundary points consist of points that are included both in the road boundary coordinates and the key points.

15. The device according to claim 10, wherein the controller is further programmed to:

compare the road boundary coordinates against key points of the receiver vehicle to obtain another transformation information; and calibrate the key points of the receiver vehicle using the another transformation information to obtain the calibrated key points of the receiver vehicle.

16. The device according to claim 10, wherein the point cloud is obtained by one or more Lidar sensors of the sender vehicle.

17. The device according to claim 10, wherein the controller is further programmed to:

transform data from the sender vehicle according to the transformed coordinates of the sender vehicle; and control the receiver vehicle to drive autonomously based on data obtained by the receiver vehicle and the transformed data from the sender vehicle.

18. A system comprising:

a sender vehicle comprising a controller programmed to:

obtain key points from a point cloud obtained by the sender vehicle;

obtain road boundary coordinates from course map information; and compare the road boundary coordinates against the key points;

obtain transformation information based on the comparing, wherein the transformation information comprises a difference between the road boundary coordinates and the key points;

generate matched road boundary points based on the transformation information;

calibrate the key points, based on the transformation information to generate calibrated key points of the sender vehicle based on the comparing of the road boundary coordinates against the key points using transformation information;

and a receiver vehicle comprising a controller programmed to:

generate augmented key points by combining the matched road boundary points and calibrated key points of the receiver vehicle, wherein the calibrated key points of the receiver vehicle are based on a second point cloud and second pose information associated with the receiver vehicle;

register the calibrated key points of the sender vehicle against the augmented key points to generate a vehicle-to-vehicle transformation matrix; and transform coordinates of the sender vehicle into a coordinate system of the receiver vehicle using the vehicle-to-vehicle transformation matrix.

19. The system according to claim 18, wherein the controller of the sender vehicle is further programmed to:

translate the point cloud to a road center based on road center coordinates from the course map information;

segment the translated point cloud to obtain the key points;

register the road boundary coordinates against the key points using an iterative closest point algorithm to obtain transformation information; and calibrate the key points using the transformation information.

20. The system according to claim 18, wherein the controller of the receiver vehicle is further programmed to:

transform data from the sender vehicle according to the transformed coordinates of the sender vehicle; and control the receiver vehicle to drive autonomously based on data obtained by the receiver vehicle and the transformed data from the sender vehicle.

* * * * *